INVENTOR.
William C. Crimmins,

INVENTOR.
William C. Crimmins.

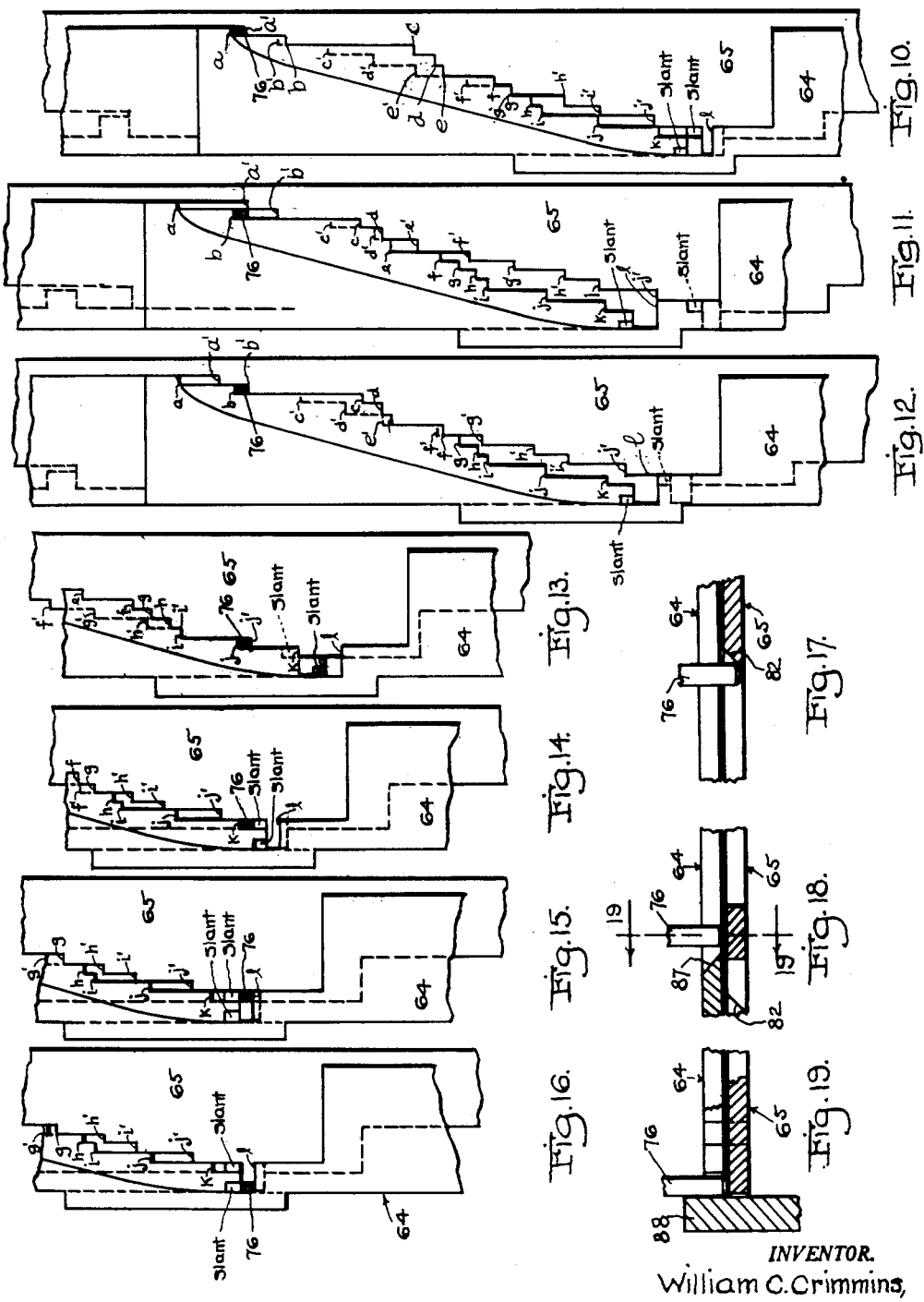

UNITED STATES PATENT OFFICE 2,624,811

SEQUENTIAL TIMER AND THE LIKE

William C. Crimmins, Marion, Ind.

Application July 28, 1949, Serial No. 107,256

14 Claims. (Cl. 200—33)

This invention relates to improvements in sequential timers, and the like. Such devices are intended to deliver signals, generally electrical, in sequence over specified circuits, in selected sequence, and under timed control. Generally, also, such devices operate through a cycle of movements between an initial or beginning position and a terminal or concluding position; and generally these devices are pre-set or loaded by the operator whereupon they move through the desired cycle of movements, delivering the desired electrical signals in proper sequence and timing, to the conclusion of the cycle or the series of signals. These signals may be sustained signals or circuit closures such as the delivery of current to a motor or other element, or they may be short signals. In any case, the sequential timer is intended and does deliver its signals in proper sequence and timing, and sustains said signals for the selected time intervals.

An important feature of the present invention is to provide a sequential timer including a timing element which moves at uniform speed in the unloading direction, together with a contact control unit which is advanced step-by-step, and an intermediate unit which operates under control of the timing element to release the contact control unit periodically for its step-by-step advances. This intermediate unit may be so formed that the releasing operations occur at different time intervals, depending on the desired timing of the operations of opening and closing various circuits which are controlled by the device. These time intervals at which successive releasing operations of the contact control unit occur may be uniform or, as is generally the case, they may be of unequal durations. Thus the changes of various electrical circuits controlled by the device may occur at pre-selected time intervals, and to meet the requirements of various operations which are to be controlled.

One use for devices embodying the features of the present invention is for the control of various units and the various operations of an electrical washing machine. Such a machine includes the driving motor, various valves, and also gear and clutch devices or the like for effecting various connections and disconnections at different times during the cycle of operations of such washing machine. These elements are to be controlled and operated in proper sequence, and for proper time intervals, according to the requirements of the washing machine. A sequential timer embodying the features of the present invention may be so designed as to properly control the various circuits for such a washing machine. Such use of timers embodying the features of the present invention is mentioned merely by way of illustration, and not as a limitation of the present invention, as it will presently appear that sequential timers embodying my present invention may be used for many purposes, and in connection with many kinds of machines, and that fundamentally such sequential timers are for the purpose of controlling the closing and opening of various electrical circuits at prescribed time intervals, and for thus controlling the various electrical functions assigned to such sequential timer.

It is a further important object of the present invention to provide a sequential timer which will effect the various circuit closing and opening operations suddenly or with a snap action so as to avoid burning of contacts and for giving other benefits which are attendant on such snap action. In this connection it will be understood that the timer unit which controls the contact control unit generally operates at relatively slow speed, depending largely on the total time interval of the cycle, and such total time interval may be as much as ten or fifteen minutes or longer. If the contact control unit were directly connected to and driven by such timer unit the opening and closing of the various contacts would occur at slow speed. It is an important feature of the present invention that I provide an intervening unit which is so designed that the contact control unit shall remain stationary while the timer unit advances from each time position to the next time position, and so that at the conclusion of each time interval the contact control unit will be released and allowed to advance to its next position, with a sudden movement. Thereby the changes of contact positions will be produced suddenly, whether for circuit opening or circuit closing purposes. Thereby, also, the operations of opening and closing the various circuits are effected independently of the rate of advancement of the timer unit.

By the provision of such intervening unit between the timer unit and the contact control unit it is also possible to use specified timer units (operating at specified timing rates) for control of the advancements of the contact control unit at various timed intervals. Thereby it is possible to include in the combination of timer unit and contact control unit an intermediate control unit which will release the contact control unit step-by-step for any specified timing releases as determined by such intermediate control unit.

The intervening control unit includes a primary cam or escapement element which is provided with releasing shoulders or escapement points which are spaced from each other amounts proportionate to the durations of successive time intervals at which the contact control element is to be released; and also includes a secondary cam or escapement element which is provided with shoulders or escapement points which are spaced from each other by amounts proportionate to the amounts of the successive advancements of the contact control element which it is desired to produce. Generally these advancements of the contact control element will be of equal amounts, but this is not necessary, as far as the present invention is concerned.

By the provision of this intermediate control element it is possible to use a contact control element of selected contact control spacings, and a timer element having a uniform rate of movement, and to release the contact control element at varying time intervals for successive contact groupings, and to meet specified timing requirements of the sequential timer. By this means it is also possible to use a specified design and construction of timer element for a very wide range of timing requirements, and with a wide range of contact control specifications, provided only that all intended uses of such timer element shall be within the time capacity of such element, that is, shall all be within the total or maximum time interval of which such timer element is capable.

It is a further object of the present invention to provide an intermediate control unit wherein the primary and secondary cam or escapement elements are nested or telescoped together, thus materially reducing the axial length of such intermediate control unit with attendant advantages of reduction of size and cost of the sequential timer, as a whole.

The power required for operation of the contact control unit is substantial in amount, and must be sufficient to properly actuate the various contact elements. It is a further object of the present invention to provide a construction in which the energy required for these operations is derived from a power spring independent of the main spring of the timer element. This power spring is wound by the same operation which sets the timer element into its starting position, and the advancements of the secondary cam or escapement element, and of the contact control element are produced by such power spring at successive releases as permitted by the advancements of the primary escapement element which is driven by the timer element. By this means it is possible to make use of a timer element having a main spring of only sufficient capacity and power to meet the demands of advancing the gear train of such timer element and the primary cam or escapement element; and the requirements of advancing the secondary cam or escapement element, and the contact control unit are met by the power spring previously referred to.

It is a further and important object of the invention to provide a very simple and effective design of escapement follower which is controlled by the primary escapement or cam element, and which in turn controls the secondary escapement or cam element. This escapement follower is so designed and is so related to the primary and secondary escapement or cam elements that during the initial setting or "loading" of the device said follower is automatically moved to its beginning control position against the action of a simple form of spring; and is so designed and related to the parts with which it engages that it will move through a proper sequence of movements as the sequential timing or "unloading" operations progress, until the final or terminal position is again reached at the conclusion of its cycle.

The present device is provided with a hand grip by which the main shaft may be turned in the setting or loading direction for initially winding the timer element main spring and the power spring simultaneously. The timer element may be of any one of various well known and widely used timers which are known in this and related arts. A convenient design and construction of such timer elements is one which is so designed that when it has been initially wound or set or loaded it will proceed to discharge itself slowly and at uniform rate until conclusion of its cycle. It is, additionally, provided with a clutch arrangement whereby the operator may, if he so desires, advance the operation in the unloading direction faster than the normal unloading rate, even to the extent of completely unloading the device and returning it to its initial position. Such advancement of the rate of discharge may be effected by rotating the hand grip in the opposite or unloading direction with force sufficient to overcome the holding effect of such clutch element. By such advanced rate of discharge the various units will be caused to move through their several operations in regular order, but at much faster rate than the normal rate of discharge. Furthermore, in case of such advanced rate of discharge the primary and secondary escapement or cam elements will also move through their several operations, and the escapement follower will also move through its successive positions in regular manner.

It is here to be noted, however, that when a discharging or unloading movement from the loaded position has commenced the escapement or cam follower element moves into a position such that backward movement of the primary and secondary escapement elements cannot properly occur, since the escapement follower cannot follow such retrograde movements correctly. It is therefore a further object of the invention to make provision for ensuring against any retrograde or backward movement of the parts when an unloading operation has once commenced. This will ensure that when an unloading operation has once commenced it will continue (in some cases with interruptions) always in the unloading direction, until completed. To this end I have provided a form of interlock or full stroke device which will act to prevent any movement in the loading direction when an unloading has once commenced. This device will also ensure that when a cycle of electrical signals or connections has been started such cycle shall be continued through to conclusion without back-up and resulting repetition of circuit connections which have already been taken care of. This is an important feature since the devices which are electrically controlled by this sequential timer are generally also interrelated in such manner that their various operations must be effected in a specified order or succession.

It is sometimes desirable to interrupt the functioning of the timer when it has been only partially discharged, and to thereafter resume its operations after lapse of an interval of greater or less duration. For example, in the case of a washing machine which has been placed in operation under control of the sequential timer it may be desired, after such operation has commenced, to stop the operations for a time. In such case, when the operation is to be recommenced the sequential timer should resume where it was stopped, and should continue its operations through the remaining portion of the cycle in proper manner. Likewise, in such case the time interval for the set of electrical connections which was in force at the instant of interruption should be continued for an additional time interval to properly take care of the total time interval assigned to such connections. I have made provision for interrupting the discharging operation under control of the operator, and for resuming such discharging operation also under control of the operator whenever desired.

In connection with the foregoing it is also noted that whenever the normal discharge of the timer is interrupted as above explained all electrical circuits then in circuit connection should be interrupted during the interval that the sequential timer is out of service, so that improper and over-extended operations will not occur. For example, if a motor is being supplied with current for driving the washing machine at the time of such interruption, the operation of such motor should be interrupted as long as the timer interruption continues, and such motor operation should be resumed when the timer operation is resumed, and should continue until the timer changes the circuits according to the intended cycle of operations. I have made provision herein for effecting such interruptions as above mentioned, and also for discontinuing all current supplies during the interval of the interruption, and for resuming the current supplies when the interruption is terminated.

During the cyclic operation of the timer in the unloading direction the various signals are given in predetermined sequence and for predetermined sustained intervals. The arrangement herein disclosed is such that during this unloading operation current is supplied from a main switch or contact. This switch remains closed during the unloading operation so that the various circuit switches or contacts will be supplied with current when they close, and while they remain closed. During the loading operation the various disks which operate these circuit switches or contacts are functioned in reverse order or through a reversed cycle, and if the main switch or contact should remain closed during this loading movement it is evident that the various circuits supplied by the timer would receive signals in reversed order or sequence. Such a condition would be not only disadvantageous, but it might and probably would result in serious improper functioning of the various units supplied with current by the timer.

I have made provision for ensuring the closing of the main switch or contact just prior to or at completion of the loading movement, and for retaining such switch in closed position during the entire unloading movement (unless said unloading movement is manually interrupted as hereinbefore mentioned); and I have made further provision for opening said main switch or contact at completion of the unloading movement, and for retaining said switch in opened position until the parts have been again moved to the fully loaded position, or just prior to completion of the movement in the loading direction. By this means there is assurance that no current will be supplied to the various signal or supply switch or contacts will not receive current during the loading movement, so that no delivery of current to the supplied units in reverse order can occur; and there is assurance that just at completion of the loading movement the main switch or contact will close so as to deliver current to the various circuit supplying contacts as required, during the unloading operation.

Other objects and uses of the invention will appear from a detailed description of the same, which consists in the features of construction, and combinations of parts hereinafter described and claimed.

Figure 1:
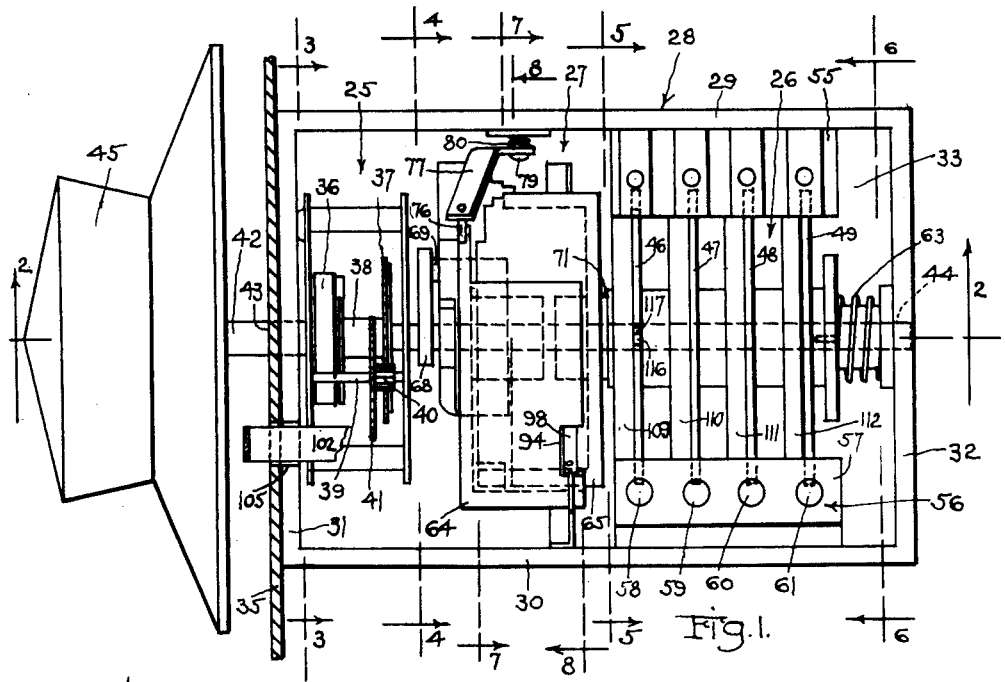
Figure 1 shows a plan view of a typical sequential timer embodying the features of my present invention, the top cover plate being removed to show the interior construction, and the parts being in their initial or unloaded positions.
Figure 2:
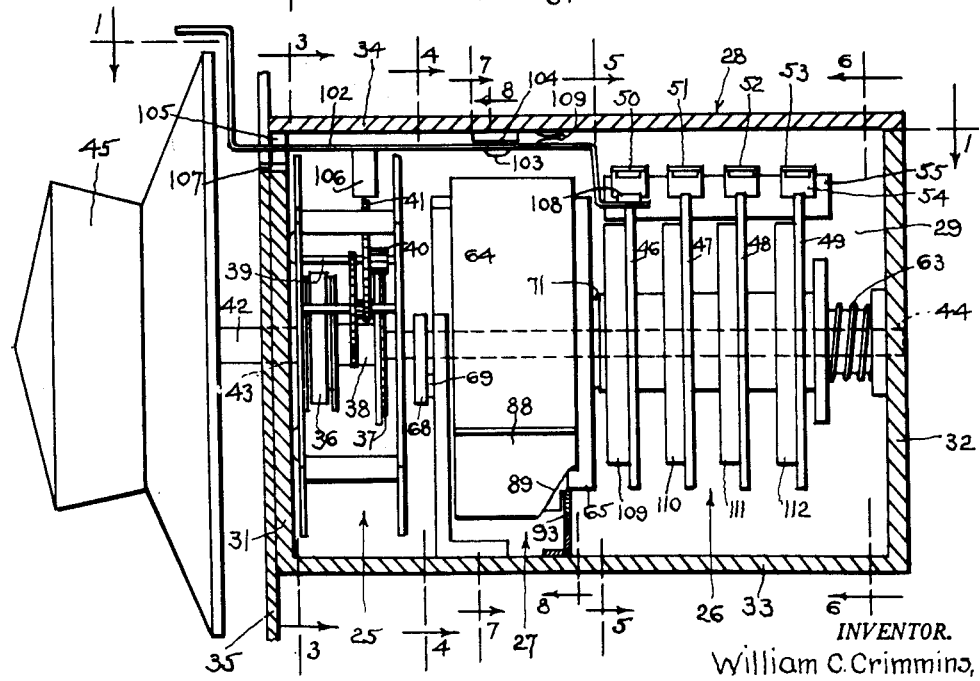
Figure 2 shows a vertical section corresponding to Figure 1, being taken generally on the line 2—2 of Figure 1, looking in the direction of the arrows, but showing most of the elements in elevation for better illustration.
Figure 8:
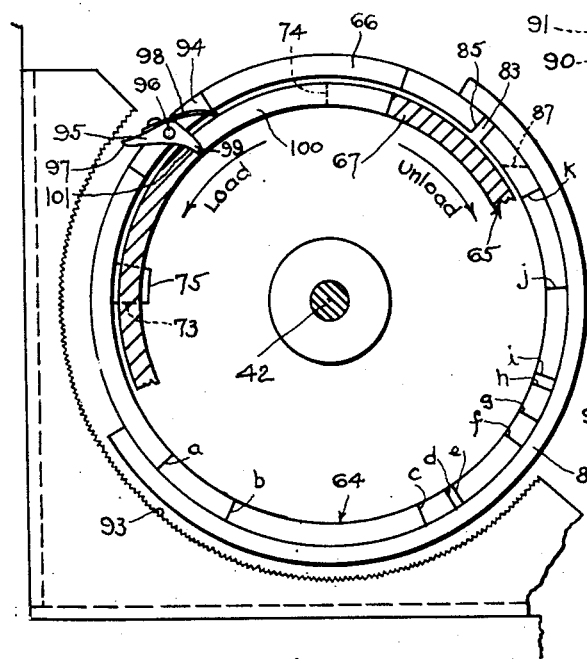
Figure 9:
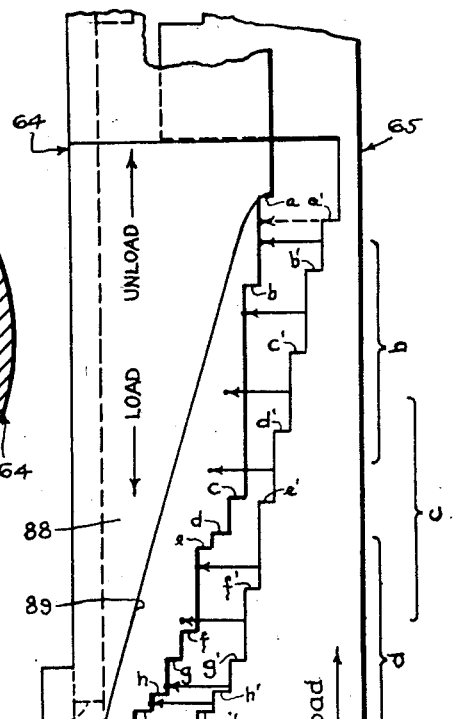

Figure 8 shows a partial cross-section taken on the lines 8—8 of Figures 1 and 2, looking in the directions of the arrows, and it shows an edge or end view of the primary escapement element, with a portion of the enclosed secondary escapement element in section, and it also shows the full-stroke or loading preventive dog carried by the primary escapement element and interengaged by the secondary escapement element to hold said dog in its non-preventive position which is its position during the normal loading of the device to fully load it at commencement of a cycle of operations;

Figure 9 shows a development of the primary and the secondary escapement elements when they occupy their relative positions during loading and when in their initial positions, but with said parts separated axially some distance so as to avoid confusion in the showing of their shoulders; and the loading and unloading directions of movement are shown in this figure by the arrows;

Figure 10 shows a development of the primary and the secondary escapement elements when they have been rocked or rotated fully to the loading position, and this figure also shows the tooth of the escapement follower in its corresponding position ready for the commencement of an unloading and timed operation;

Figure 11 shows a development similar to that of Figure 10, but with the primary escapement element moved to its first shoulder or escapement position for the first release of the escapement follower, and with the escapement follower moved laterally into the corresponding shoulder of the primary escapement element, but immediately prior to the advancing movement of the secondary escapement element to the corresponding released position;

Figure 12 shows a development similar to that of Figure 11, but with the escapement follower shifted laterally into the shoulder of the primary escapement element, and the secondary escapement element advanced under urging of the power spring to position where further advance is limited by the escapement follower whose position was determined by the shoulder of the primary escapement element;

Figure 13 shows a fragmentary portion of a development similar to those of Figures 10, 11 and 12, but it shows only the terminal end portions of the primary and secondary escapement elements, the primary escapement element having reached the final shoulder position, and the secondary escapement element having registered with such shoulder to limit the movement of the contact control element accordingly;

Figure 14 shows a fragmentary portion similar to that of Figure 13, but the primary escapement element having advanced to the shoulder which constitutes the first transfer position of the escapement follower;

Figure 15 shows a fragmentary portion similar to those of Figures 13 and 14, but the secondary escapement element has advanced to the limit of movement permitted by the escapement follower, and said follower had ridden up along the slant of the secondary escapement element to cause the first lifting movement of said follower;

Figure 16 shows a fragmentary portion similar to those of Figures 13, 14 and 15, but the escapement follower has been shifted laterally into its final position for the termination of all movements, and ready for commencement of the next cycle of movements under manual setting or loading of the device;

Figure 17 shows a fragmentary section taken on the line 17—17 of Figure 9, looking in the direction of the arrows, and it shows the rising slant at the end of the control portion of the secondary escapement element, together with the lower end of the escapement follower pin just prior to riding of the slant under said pin to raise the pin;

Figure 18 shows a fragmentary section taken on the line 18—18 of Figure 9, looking in the direction of the arrows, and it shows the rising slant at the beginning of the control portion of the primary escapement element, together with the lower end of the escapement follower pin just at the terminus of all operations of the cycle, and in the position said parts occupy ready for commencement of the next cycle of operations; and Figure 19 shows a transverse section taken on the line 19—19 of Figure 18, looking in the direction of the arrows.

The embodiment shown in the drawings includes the three elements, namely the usual timer element 25, the contact control element 26, and the intermediate escapement element 27. These are conveniently shown as housed in the box-like structure 28 which includes the side walls 29 and 30, the front and back end walls 31 and 32, the bottom 33, and the removable top 34. This housing may be made of metal or may be of moulded material, as desired. Also, I have, by way of illustration, shown this housing as being supported by and against the sheet 35 which may constitute a portion of a washing machine, for example. The timer element may be of more or less conventional form, and the form shown includes the main spring 36 driving the gear 37 through the medium of the sleeve 38; and a suitable clutch may be included in this gear train such clutch having sufficient holding force to transmit all usual driving forces, but not sufficient to prevent manual advancement of the driven element, as already mentioned herein. The complete gear train is not shown in the figures, but there are shown the shaft 39 carrying the pinion 40 which meshes with said main gear 37; and this shaft carries the gear 41 which will be hereinafter referred to.

There is provided a main shaft 42 extending through the length of the device (in the form shown in the drawings), and said shaft is journalled in the front and back end walls of the housing as shown in Figures 1 and 2, at 43 and 44, respectively. The front or exposed end of this shaft carries the hand grip or disk 45 which is of size convenient for ready grasp by the hand, and also for exertion of sufficient force to wind or "load" the device at the beginning of an operation.

The contact control element shown includes the group of four cam disks 46, 47, 48 and 49 journalled on the shaft 38, but said disks are connected together so that they rotate or remain stationary as a unitary group. These disks have their edges suitably cammed or notched to cause sequential closing and opening movements of the several contacts as the disks are rotated, according to well understood principles; and in the drawings I have not shown the details of such notching, but I have shown typical notches for some of the disks by way of illustration as will hereinafter appear. Suitable spring or leaf contacts 50, 51, 52 and 53 are provided corresponding to these disks; and said leaf contacts are provided with the cam engaging portions 54 which rest on the edges of the corresponding disks the leaf spring contacts being normally biased downwardly so that said portions 54 continually engage the disk edges. These leaf spring contacts are carried by the insulating block 55 mounted on the side wall 29 of the housing; and there is another insulating block 56 mounted on the opposite side wall 30 of the housing. This block 56 carries a conducting block 57 which has the upwardly facing contacts 58, 59, 60 and 61 in position for engagement by the free ends of the leaf spring contacts when said leaf contacts are allowed to spring down according to the notching of the disks 46, 47, 48 and 49. In the arrangement just described the terminal 62 of the leaf contact 50 is connected to one current supply line, so that when said leaf contact is allowed to lower to engage said leaf contact with the stationary contract 58 the block 56 is electrified, and current will be supplied to all leaf contacts which may be allowed to lower into engagement with their respective stationary contacts. Also, by raising this supply leaf contact 50 away from its stationary contact the block 56 will no longer be electrified, and supply of current to all delivery circuits will be discontinued as long as such leaf contact 50 is retained in its raised position. This fact will be hereinafter referred to again.

The group of contact disks is journalled on the shaft 42, as already stated; and a power spring 63 is located at the back end of said group of disks. This spring has one end anchored to the back wall of the housing, and the other end of said spring is connected to the back disk of the group. This spring is normally biased sufficiently strongly to ensure complete return of the group of disks (and the secondary escapement element, presently to be described), as will hereinafter appear.

The intermediate or escapement element 27 includes the primary escapement element 64 and the companion secondary escapement element 65. These escapement elements are concentric with each other and with the shaft 42, and both are journalled for rotation with respect to said shaft. In the form illustrated these escapement elements are of cylindrical or barrel shape, the primary escapement element including the cylindrical portion 66, and the secondary escapement element including the cylindrical portion 67. These cylindrical portions are telescoped together, the primary cylindrical portion being sufficiently larger than the secondary cylindrical portion to permit such telescoping to be effected.

Figure 7:
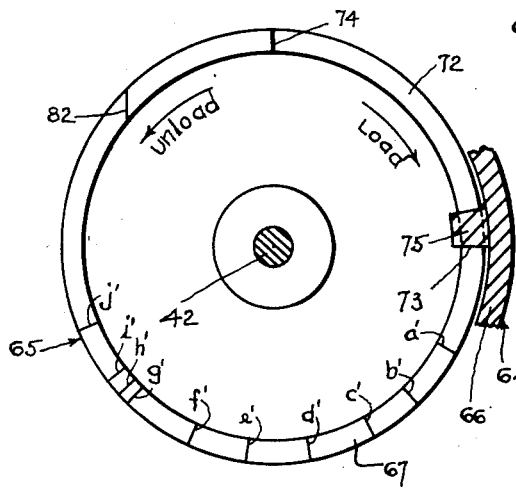
Figure 7 shows a partial cross-section taken on the lines 7—7 of Figures 1 and 2, looking in the directions of the arrows, and it shows an end or edge view of the secondary escapement element, with a portion of the enclosing primary escapement element in section.

A driving connection is effected from the shaft 42 to the primary escapement element 64; and in the form illustrated such drive is effected by the arm 68 secured to the shaft and carrying the pin 69 which engages with the radial slot 70 of the primary escapement element 64. A driving connection is established between the secondary escapement element 65 and the set of contact control disks, by means of the hub connection 71, as shown in Figures 1 and 2. It will now be seen that by turning the hand grip 45 clockwise (when viewed from the front of the device, being the left-hand end in Figures 1 and 2), the shaft and the primary escapement element 64 will be rotated clockwise. This operation will wind the main spring of the timer element 25 to its full extent preliminary to carrying through a timing operation. The front edge of the secondary escapement element is provided with a notch or recess 72 extending between the end abutments 73 and 74 which subtend an arc of substantially 90 degrees (see Figures 7 and 8), and within the primary escapement element there is provided the lug 75 carried by such primary escapement element and adapted to ride within said notch or recess 72 as shown in Figures 7 and 8. The lug and the end abutments of the recess are so positioned that during the winding operation just referred to the lug 75 will be in engagement with the end abutment 73 to thus cause the secondary escapment element to rotate in the winding direction harmoniously with the rotation of the hand grip 45, the shaft 42, and the winding of the main spring of the timer element 25. Therefore during this winding or loading operation the main spring of the timer is wound, the primary escapement element is rotated in the loading direction; and due to the engagement of the lug 75 with the abutment 73 of the recess 72 the secondary escapement element is also rotated harmoniously with the rotation of the primary element to the complete extent of the loading rotation. This loading rotation of the secondary escapement element also rotates the group of disks the full extent in the loading direction; and due to the connection of the free end of the power spring 63 with the back disk said power spring is also fully wound during the loading rotation.

At this point it is noted that the arc subtended by the recess 72 is great enough to allow for such retrograde or unloading rotation of the primary escapement element independently of corresponding rotation of the secondary escapement element as may be necessary for certain functions to be presently explained. In other words, the primary escapement element may rotate backwardly or in unloading direction under control of the timer element 25, leaving the secondary escapement element behind and held against unloading rotation by the escapement follower, even against the force of the power spring, as will be presently explained; provided that such independent unloading movement of the primary escapement element does not exceed the arcuate embracement provided by the recess or notch 72 (minus the width of the lug 75).

The back edge of the primary escapement element is provided with a series of successive shoulders, $a$, $b$, $c$, $d$, $e$, $f$, $g$, $h$, $i$, $j$, and $k$ (or such other number of shoulders, either greater or less than those recited, depending on the requirements of the sequential timer, and its intended use). These shoulders are successively stepped forwardly in the back edge of the cylindrical portion of the primary escapement element as well shown in Figures 9 to 16, inclusive, and the depths of these shoulders are all equal, and of size to properly accommodate the escapement follower pin, presently to be described. These shoulders are also spaced from each other angularly at distances corresponding to the sequential timing operations to be effected by the device. In this connection it is understood that the timer element, when once loaded by rotation of the hand grip clockwise to the full extent, will unload at substantially uniform rate under impulse of its main spring and under control of its own escapement element, and during such unloading rotation of this timer element the shaft 42 will also rotate slowly and at substantially uniform rate in the unloading or counterclockwise direction. Such unloading uniform rate rotation of the shaft will be communicated to the primary escapement element 64 through the medium of the arm 68 and pin 69 engaging the slot 70. Thus the primary escapement element will be unloaded at uniform rate during the unloading operation.

The various shoulders $a$ to $k$ are formed at angular spacings according to the various time lapses desired between successive movements of the contact control disks. In the form shown in the figures it will be seen that these distances are very non-uniform, some being much longer than others. Thus, the distance from shoulder $b$ to shoulder $c$ is much greater than the distance from shoulder $a$ to shoulder $b$, or from the shoulder $c$ to shoulder $d$, etc. Thus the time intervals required for the primary escapement element to pass from one shoulder to the next will depend on the spacings of such shoulders. Such spacings will be made to conform to the requirements of timing operations as specified for the timer.

The secondary escapement element 65 has its cylindrical flange also provided with shoulders formed in its front edge, these being shown at $a'$, $b'$, $c'$, $d'$, $e'$, $f'$, $g'$, $h'$, $i'$, $j'$ and the depths of these shoulders are substantially equal to the depths of the shoulders in the primary element. These shoulders of the secondary escapement element may be uniformly spaced or spaced at other amounts as desired. However, it is here noted that these shoulder spacings of the secondary escapement element determine the amounts by which the contact control disks will advance at each escapement release, and thus the spacings of these secondary escapement element shoulders should be such as to ensure proper corresponding advancements of the contact control element for successive releasing operations. It is also noted that at each releasing operation of the secondary escapement element said element, and the connected set of disks will be advanced suddenly under the rather large force exerted by the power spring 63 which tends to rotate said parts in the unloading direction.

Figure 4:
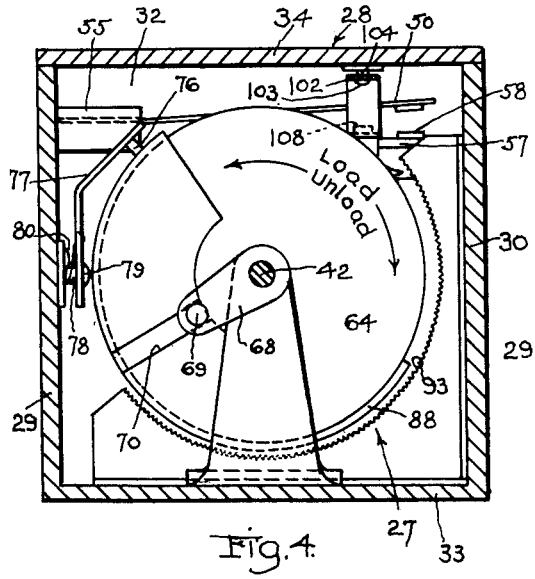
Figure 4 shows a cross-section taken on the lines 4—4 of Figures 1 and 2, looking in the directions of the arrows.
Figure 5:
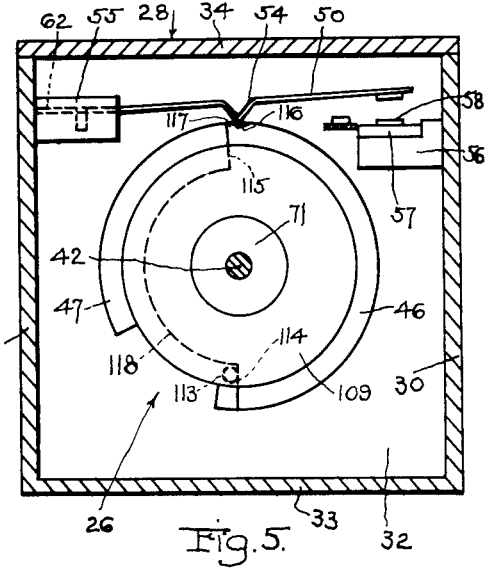
Figure 5 shows a cross-section taken on the lines 5—5 of Figures 1 and 2, looking in the directions of the arrows.
Figure 6:
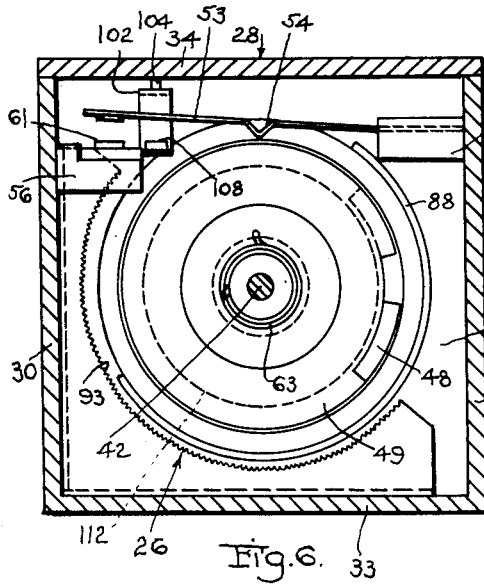
Figure 6 shows a cross-section taken on the lines 6—6 of Figures 1 and 2, looking in the directions of the arrows.
Figure 3:
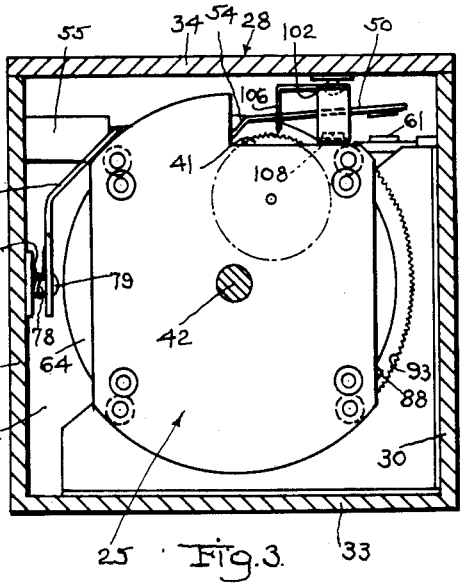
Figure 3 shows a cross-section taken on the lines 3—3 of Figures 1 and 2, looking in the directions of the arrows.

There is an escapement pin or stud 76 (shown in section in Figures 10 to 16, and also elsewhere in the drawings). This pin is capable of movement axially, that is substantially parallel to the axis of the shaft 42, and it can also swing slightly towards and from said shaft so as to be closer to or further from said shaft by the amount of such swing; but said escapement pin is not allowed to move angularly in a plane at right angles to said shaft. That is, this escapement pin cannot follow the rotations of the shaft on the axis of the shaft. A convenient construction is that shown, wherein said pin is rigidly carried by the free end of an arm 77 which lies to one side of the escapement unit (see Figure 4 in particular). The other end of said arm is anchored to a pin 78 by a loose hole formed in the end portion of the arm, the pin 78 having a head 79 sufficiently large to prevent the arm from disengaging from said pin 78. This loose engagement of the arm with the pin permits a slight rocking movement of the arm towards and away from the shaft 42, and also permits the arm to swing forwardly and backwardly within the sequential timer, that is, parallel to the axis of the shaft 42. There is a rather stiff spring 80 having one end anchored to the side wall 29 of the housing, and its other end in engagement with the arm 77. This spring is so biased that it exerts two forces on the arm, a force tending to rock the arm forwardly, towards the front wall of the housing, 31, and also tends to rock the arm inwardly towards the shaft 42. Therefore this spring tends to maintain the escapement pin 76 always in engagement with the face or edge of the cylinder of the primary escapement element 64, and also said spring 80 tends to hold the escapement pin 76 towards the shaft 42 with force sufficient to ensure certain of the operations presently to be described. It will be understood that the pin 76 may be forced outwardly against the force of such spring as needed, but the spring will restore the pin inwardly at the proper sequential operation. Back and forth movements of the escapement pin correspond to escapement movements; inward and outward movements of the pin correspond to "transfer" movements required for the loading operation, and for the termination of a cycle and the commencement of another cycle.

The escapement pin 76 is of substantially the full depth of the various shoulders formed in the edges of the primary and secondary escapement elements, as well shown in Figures 10 to 16, inclusive. Furthermore, the primary and secondary escapement elements are so located (in their telescoping) that the shoulders of the primary element lie in the same planes (normal to the axis of the shaft 42) as corresponding shoulders of the secondary element. For example, the shoulders $a$ and $a'$ lie in the same normal plane, the shoulders $b$ and $b'$ lie in the next normal plane, etc. Therefore whenever the escapement pin 76 lies in a given position, that is, against an edge face of the primary escapement element cylinder between two successive shoulders thereof, for example $a$ and $b$ (see Figure 10), the secondary escapement element is locked against forward movement under the impulse of the power spring 63, even when the primary escapement element advances in the unloading direction, with corresponding movement of its shoulder away from the escapement pin 76. Such locking is due to engagement of the corresponding secondary escapement element with the pin 76. The said pin 76 is held against the face of the primary escapement cylinder by reason of the bias of the spring 80 in such manner as to tend to rock the arm 77 towards the front of the device as already explained.

The escapement pin 76 will be held in unchanged position until the primary escapement element has rotated (under the force of the main spring of the timer element 25) far enough to bring the next shoulder of the primary escapement element into alignment with the escapement pin 76, for example, until the shoulder $b$ has come into the position shown in Figure 11. At that instant the arm 77 and the escapement pin 76 will be rocked slightly towards the front of the device, thus carrying said pin against the next face of the primary escapement element, that is, the face between the shoulders $b$ and $c$ in Figure 11. As the escapement pin 76 thus moves it will release from the original shoulder $a'$ of the secondary escapement element, thus allowing said secondary escapement element to suddenly advance in the unloading direction under impulse of the power spring 63, and carrying with it the group of contact control disks. Such advancing movement of the secondary escapement element and the disks will be limited by engagement of the next shoulder ($b'$) of the secondary escapement element with the escapement pin 76, as shown in Figure 12. Thus there has been effected a transition of the contact control disks very suddenly from one position to the next position, and this next position will be retained until the primary escapement element advances far enough in its unloading movement to bring the next shoulder of its series into position to release the escapement pin 76, this being the shoulder $c$. When said shoulder $c$ thus releases the escapement pin 76 the secondary escapement element will be again released to allow its next shoulder $c'$ to come into arresting engagement with the escapement pin 76. In this manner the sequence will continue until the operation arrives at the unloading terminus of the series of operations.

It is now evident that I have made provision for effecting sudden releases of the secondary escapement element, together with the contact control disks, for advancements of substantial amount each time, and that the timed intervals at which such releases will occur are dependent on and are controlled by the form of the shouldered portion of the primary escapement element.

It is here noted that in order to allow the escapement pin 76 to originally enter between the primary and secondary element shoulders $a$ and $a'$ (to the position shown in Figure 10), it is necessary that said shoulder $a'$ of the secondary element should be spaced from the shoulder $a$ of the primary element an amount at least equal to the size of the escapement pin 76. It is also noted that during the initial loading movement in clockwise direction, under force delivered by the hand grip 46, the driving of the secondary escapement element against the power spring 63 is being effected by the engagement of the lug 75 with the end abutment 73 of the secondary escapement element (see Figures 7 and 8). Therefore such lug 75 should be so related to the end abutment 73 that during this loading operation and movement there will be retained between the shoulders a and a' this required clearance of amount sufficient to accommodate the escapement pin 76, when said pin is brought to such position as will be presently explained.

It is also to be noted that as the primary escapement element moves at uniform speed from its original loaded position (shown in Figure 10) it leaves behind it the secondary escapement element until said second element is released by swinging movement of the escapement pin 76. When such release occurs the secondary escapement element will advance towards its original position (angularly) with respect to the primary escapement element, and until limited by engagement of the next shoulder of the secondary element against the escapement pin 76. Now such advance must not be more than the amount by which the primary escapement element had moved forwardly as otherwise the end abutment 73 of the secondary escapement element will come against the lug 75 of the primary escapement element and cause interference. Such interference would either lock the secondary escapement element and the contact control disks prematurely and prevent their advancement to the full amount intended, and would result in a subsequent slow advancement of the secondary escapement element and the disks until the shoulder of the secondary escapement element reached and engaged with the escapement pin 76. Thereupon further advance of the secondary escapement element and the disks would be arrested until the next releasing operation allowed by the unloading movement of the timer element 25. In case the power spring were sufficiently strong it would, under the conditions just explained force the timer element 25 to speed up until the engagement of the next shoulder of the secondary escapement element with the escapement pin 76.

In harmony with the foregoing explanation it may also be stated that when unloading movement of the primary escapement element commences (from the position shown in Figure 10), the amount of angular movement of said primary escapement element must always be greater than angular movements of the secondary escapement element until the terminus of the operation is reached.

I have shown how this escapement element operates step-by-step during the normal functioning of unloading. I shall now show the operations connected with terminating an unloading operation and bringing it to conclusion, and also in connection with the original setting of the parts during the original loading operation. The description already given assumed that the primary and secondary escapement elements were in their positions shown in Figure 10, and the explanations so far given started on that assumption.

Referring first to Figure 13, in that figure the escapement elements are in position where the escapement pin 76 stands between the shoulders j and j', being the last contact control position. As the primary escapement element moves from the position of Figure 13 the shoulder j moves away from the escapement pin 76 the secondary escapement element being retained against movement for the time being by engagement of the shoulder j' with the escapement pin. When a shoulder k of the primary escapement element reaches the pin 76 said pin shifts laterally to the position of Figure 14, thus releasing the secondary escapement element which then advances under the force of the power spring. Such advance of the secondary escapement element brings its shoulder 73 into engagement with the lug 75 of the primary escapement element and further advance of the escapement elements in the unloading direction occurs with these parts in retained relative position.

The secondary escapement element, being within the primary element, may be considered as being at a lower level than the primary element. The secondary element is provided with a forwardly extending lug portion 81 and there is a slanting ramp 82 formed from said lug 81 and facing in the direction of unloading movement. This slanting or ramp portion 82 stands in line with the shoulder k of the primary escapement element as shown in Figure 14 among others, and in position to pick up the escapement pin 76 at the proper time and bring the lower end of said pin to the level of the surface of the secondary escapement element. In moving from the position of Figure 14 to that of Figure 15 the secondary escapement element has thus raised the escapement pin and delivered it onto the top surface of the lug portion 81, at which level it will be retained until a succeeding cycle of operations is under way.

The primary escapement element is provided with a forwardly extending gate 83 which reaches forwardly from a position in alignment with the primary element face 84 (which commences at the shoulder k, to a terminal position for the escapement pin 76. At the far side of this gate 83 (that is, at the following side considered during unloading movements), the primary escapement element is provided with a forwardly facing shoulder 85. This shoulder extends backwardly into alignment with the escapement pin 76 when said pin bears against the face 84, as evident from Figures 14, 15 and 16. Accordingly, as the primary and secondary escapement elements approach their terminal positions this shoulder 85 comes into engagement with the escapement pin and limits the unloading movement at that point. This fact is shown in Figure 15 where the shoulder 85 has come against the escapement pin 76. Due to the biasing of the spring 80 the arm 77 is now swung forwardly to bring the escapement pin 76 against the face 86 at the forward end of the gate, thus limiting movement of the pin and arm in the forward direction. It will also be seen from examination of Figures 14, 15, 16, 18 and 19 that during this part of the operation the escapement pin 76 is being retained on the lug 81 and thus at the level of the outer surface of the secondary escapement element, having been raised to that level by the ramp 82 as previously explained. Thus it is seen that the unloading movement is stopped by engagement of the shoulder 85 with the escapement pin 76, and that at termination of the cycle said pin stands forwardly in the position of Figure 16. The parts will retain this position until a succeeding loading is produced by manual operation of the hand knob or disk 45.

The primary escapement element is provided with a ramp or slanting portion 87 facing in direction to raise the escapement pin 76 at the beginning of the succeeding cycle. Therefore when the next cycle is started by rotation of the knob or disk 45 clockwise the primary escapement element is rotated to move this ramp 87 under the escapement pin 76 thus raising said pin and the arm 77 to bring the lower end of the pin to bear on the outer surface of the primary escapement element. The primary escapement element is provided with a raised portion 88 which extends around the primary element sufficiently far to effect control of the escapement pin 76 during the complete loading operation. This raised portion is provided with a backwardly facing curved shoulder 89 which extends from the position of the gate terminal to the position of the shoulder a. This shoulder 89 is high enough to ensure that during the rotation of the primary element in loading direction the escapement pin will be forced backwardly against the bias of the spring 80 to bring said pin into alignment with the shoulder a and to ensure that when said shoulder comes around to the position of the escapement pin during the loading movement, said pin will drop down between the shoulders a and a' into the position shown in Fig. 10. This is the fully loaded position, at which the hand grip or disk 45 is released, and thereafter the cycle will progress automatically to conclusion in the manner already explained.

In order to avoid jamming of the lower end of the escapement pin 76 when riding onto the ramps 82 and 87 this lower pin end may be slightly beveled as shown in Figures 17, 18 and 19. This will also permit use of primary and secondary escapement elements which have a slight clearance between them, as shown in various of the figures, and without jamming of the escapement pin in moving onto said ramps.

The forwardly extending lug 81 of the secondary escapement element may be accommodated within a recess 90 of the primary escapement element, as shown at Figure 9 between the points 91 and 92. It is to be noted that during the riding of the ramp 82 of the secondary escapement element under the pin 76 the driving of said secondary element is effected by the power spring 63 which is of ample force to effect such movement; and that during the movement of the ramp 87 under the escapement pin to raise said pin the force needed to rotate the primary escapement element is supplied directly by manual force through the hand knob 45.

It was stated that provision has been made for preventing rotation of the parts in the loading direction after an unloading operation has commenced, and to ensure that thereafter movement shall always be in the unloading direction until completion of a cycle. To this end I have provided a fine tooth rack 93 carried by the housing and encircling an angular embracement sufficient to meet the rotational needs of the escapement element. The primary escapement element is provided in its rear edge with a notch or recess 94 wherein is pivoted a dog 95 on the pin 96, said dog having a sharp tooth 97 facing in the forward or loading direction of movement. A spring 98 secured to this dog and having its free end bearing against the end of the recess 94 tends to rock the dog into engagement with the teeth of the rack to thus prevent rotation in the loading direction. However, the tail 99 of this dog is accommodated within a recess 100 of the secondary escapement element as shown in Figure 8, and the end 101 of this recess 100 is in such position that when the lug 75 of the primary escapement element engages the end 73 of the secondary escapement element recess 72 to cause drive of the secondary escapement element in the loading direction (during original loading), the recess end 101 engages said tail and rocks the dog into disengaged position against the spring 98 as shown in Figure 8. Therefore, during the original rotation in clockwise direction to load the device the dog is retained out of engagement with the teeth of the rack 93, so that it is possible to effect such loading movement. Then, as soon as the primary escapement element moves to a position ahead of the secondary escapement element (in the unloading direction) the notch end 101 moves away from the tail of the dog, allowing said dog to engage the rack teeth and drag along said teeth during the entire unloading movement. Any effort to rotate the parts in loading direction will be effectively resisted by the dog until completion of the cycle at which time the end 101 of the recess 100 will have caught up with the tail of the dog to disengage the dog from the rack and permit a new loading operation to be normally conducted. If at any time during the progress of unloading the secondary escapement element should come into direct register with the primary escapement element, as in case shoulders of both said elements should happen to be at equal angular distances from their starting positions of engagement with the escapement pin 76, the dog would be momentarily raised from engagement with the rack; but as soon as a slight movement of the primary escapement should be made in loading direction, the tail of the dog would be at once disengaged and the dog would at once arrest further loading movement. However, in the usual design of the parts the several shoulders on the primary and secondary escapement elements would not come into such register until completion of the cycle as already explained.

Pivoted to a convenient part of the housing, as for example, the top 34 thereof, there is a light lever 102 pivoted at the point 103 by a pin 104 extending through a slightly oversize hole of the lever to permit some freedom of rocking movement of the lever. The front end of this lever extends through a slotted opening 105 in the front wall of the device, and the outwardly extending portion of this lever may be carried up and over the hand knob 45 to a point convenient to the operator. This lever carries a downwardly extending tooth 106 in position to engage the gear 41 of the timer gear train and thus to interrupt unloading of said timer element as long as such interference continues. A notch 107 may be formed in the lower portion of one side wall of such opening 105 so that by a slight lateral swing of the lever it may be temporarily locked in its downwardly moved position, and thus retain the timer element in interrupted condition as long as desired.

The rear portion of the lever extends backwardly far enough to align with the first contact control disk, as shown in Figure 2, and said rear end is carried downwardly far enough to underlie the contact leaf 50. The end of the lever is also provided with a small insulating block 108 which may engage the underside of said contact leaf 50 to raise said leaf without electrical contact therewith. It will now be seen that when the lever is tilted to interrupt the unloading of the timer element 25 the leaf contact 50 will also be raised away from engagement with the contact 53, thus discontinuing supply of current as long as the timer interruption continues. A light spring 109 tends to return this lever to its noninterfering position when disengaged from the lateral notch 107.

I wish to point out that by properly relating the contact control disks to the locations of the shoulders of the secondary escapement element, so as to cause the high and low portions of the disks to come at proper angular relation to the shoulders of the secondary escapement element it is possible to ensure snap actions in both closing and opening the various circuits. This result is ensured by so relating these parts that the disk shoulders pass beneath the contact leaf portions 54 during the sudden movements of the secondary escapement element from shoulder to shoulder of such escapement element. This relation may also be considered from another angle as follows:

The advancements of the secondary escapement element and the group of contact control disks occur suddenly and corresponding to releasing movements effected by movement of the escapement follower pin 76 from shoulder to shoulder of the primary escapement element. By properly positioning the shoulders which connect the high and low portions of the various contact control disks said disk shoulders will pass beneath the portions 54 of the contact leaves during these sudden advancements of the disks as controlled by the escapement device. Thus the circuit closing and opening movements will occur with great suddenness, and there will never be any possibility of slow movements occuring in the contact leaf transfers between their open and closed circuit positions.

Referring especially to Figures 1, 2, 5 and 6, each of the contact control disks 47, 48 and 49 (and other circuit control disks which may be provided additional to the foregoing), is secured to a hub element, 110, 111, and 112, so that rotation of said contact control disks in harmonious with rotation of the corresponding hub element. These hub elements are secured together, as already explained and they therefore rotate as a group.

The main switch or contact disk 46, however, is not secured to its hub element 109, but lies adjacent thereto, and is free to move or remain stationary while said hub element rotates, under certain conditions. Said hub element 109 is, however, secured to the other hub elements and rotates in both the loading and unloading directions with such other hub elements. This hub element 109 carries a laterally projecting pin 113 (see Figure 5) which extends over to the plane of the main contact disk 46; and said main contact disk 46 is cut away as shown at 118 (see Figure 5) and has the end shoulders 114 and 115 which will be engaged by the pin 113 during the terminal portions of the loading and unloading movements. The amount of rotational or rocking movement which will be communicated to the disk 46 at the end of the loading movement, is just sufficient to ensure main switch closing; and the amount of rotational or rocking movement which will be communicated to the disk 46 at the end of the unloading movement is just sufficient to ensure main switch opening. The disk 46 is provided with a slight notch 116 close to the shoulder 115, so that as the movement of the disk 46 in the loading direction is completed the slight rise or dwell 117 of the disk 46 will be forced under the portion 54 of the main switch contact 50, and said contact will be permitted to suddenly spring down into its circuit closing position. Thereafter, during the unloading rotational movement of the hub 109 the pin 113 will move, step-by-step in counterclockwise direction (see Figure 5), until the pin 113 has been moved close to the disk shoulder 114. When the final step of unloading movement of the hub 109 occurs said pin 113 will engage the disk shoulder 114 and move said disk suddenly to the position shown in Figure 5, which is its final or completely unloaded position. As this final movement occurs the portion 54 of the main contact leaf 50 will be raised to open the main switch and discontinue supply of current to the block 57 so that no current will be supplied to the various supply contact leaves 51, 52 and 53 (and any others which may be provided) during the subsequent loading movement. The engagement of the portion 54 of the main contact leaf 50 with the notch 116 will be sufficient to prevent the disk 46 from following the hub 109 in the loading direction until the pin 113 again engages the shoulder 114 just prior to completion of the loading movement.

I claim:

1. In a sequential timer the combination of a timing element including main spring drive means and a main shaft in driving connection with said main spring and means to release said main shaft for rotation in the unloading direction at substantially uniform speed, a contact control element including a movable contact movable between circuit open and circuit closed positions, and including movable means to move said contact between such positions, and an escapement connection between said timing element and said contact control element, said escapement connection including primary and secondary escapement elements and an escapement follower between said primary and secondary escapement elements, a driving connection from the timing element main shaft to said primary escapement element effective to drive said escapement element at substantially uniform speed during unloading of the timing element, a control connection between the secondary escapement element and the contact control element, power spring means urging the contact control element movable means and the secondary escapement element to move in the unloading direction, together with interengageable means on the primary escapement element and the escapement follower to control movements of said follower according to movements of the primary escapement element, and interengageable means on the escapement follower and the secondary escapement element effective to lock the secondary escapement element at different positions corresponding to movements of said follower as controlled by the primary escapement element.

2. Means as defined in claim 1 wherein said interengageable means of the primary escapement element includes shouldered portions movable with said primary escapement element and adapted for engagement by the escapement follower and spaced from each other in the unloading direction amounts proportionate to successive time intervals between successive advancements of the contact control element movable means to thereby permit movements of the escapement follower at corresponding time intervals.

3. Means as defined in claim 2 wherein said shouldered portions progress successively in a given direction during continued movement of the primary escapement element during an unloading movement.

4. Means as defined in claim 1 wherein said interengageable means of the escapement follower and the secondary escapement element includes shouldered portions movable with said secondary escapement element and adapted for engagement by the escapement follower and spaced from each other in the unloading direction amounts proportionate to successive advancements of the movable means of the contact control element to thereby permit sudden advancements of the contact control movable means with a step-by-step movement in the unloading direction.

5. Means as defined in claim 4 wherein said shouldered portions of the secondary escapement element progress successively in a given direction during movement of the secondary escapement element in the unloading direction.

6. Means as defined in claim 2 wherein said interengageable means of the escapement follower and the secondary escapement element includes shouldered portions movable with said secondary escapement element and adapted for engagement by the escapement follower and spaced from each other in the unloading direction amounts proportionate to successive advancements of the movable means of the contact control element to thereby permit sudden advancements of the contact control movable means with a step-by-step movement in the unloading direction.

7. Means as defined in claim 6 wherein said shouldered portions of the primary and secondary escapement elements all progress successively in a given direction measured from a common starting position during the unloading movement.

8. Means as defined in claim 6 wherein said shouldered portions of the primary escapement element all face in the loading direction of movement and wherein said shouldered portions of the secondary escapement element all face in the unloading direction of movement.

9. Means as defined in claim 6 wherein the escapement follower includes an arm mounted for swinging movement in the direction of progress of the shouldered portions of the primary and secondary escapement element shouldered portions, together with spring means urging said arm in such direction of movement to engage the primary escapement element shouldered portions between successive shoulders thereof.

10. Means as defined in claim 1, together with interengageable means on the primary and secondary escapement elements effective to drive the secondary escapement element in the loading direction by movement of the primary escapement element in such loading direction, said interengageable means permitting movement of the primary escapement element in the unloading direction without simultaneous movement of the secondary escapement element in such unloading direction.

11. Means as defined in claim 6, together with interengageable means on the primary and secondary escapement elements effective to drive the secondary escapement element in the loading direction by movement of the primary escapement element in such loading direction, said interengageable means permitting movement of the primary escapement element in the unloading direction without simultaneous movement of the secondary escapement element in such unloading direction.

12. Means as defined in claim 11, together with means to lock the primary escapement element against movement in the loading direction, and means to make ineffective such locking means when said interengageable means of the primary and secondary escapements is effective to drive the secondary escapement element in the loading direction.

13. Means as defined in claim 1, together with interengageable means on the primary and secondary escapement elements effective to drive the secondary escapement element in the loading direction by movement of the primary escapement element in such loading direction, means to lock the primary escapement element against movement in the loading direction, and means to make ineffective such locking means when the primary and secondary escapement elements occupy a prescribed relative position.

14. In a sequential timer the combination of a timing element including a gear train including a toothed gear, a main spring drive means and a main shaft in driving connection with said main spring and means to release said main shaft for rotation in the unloading direction at substantially uniform speed, a switch control element including a rotatable element, a switch element in position for circuit controlling engagement by said rotatable element, means to support said switch element movably with respect to the rotatable element of the switch control element, said switch element being movable between an operating position where it is operable by the rotatable element and an inoperative position where it is inoperable by the rotatable element, together with means to interrupt unloading movement of said timing element and simultaneously move the switch element into its inoperative position aforesaid, said interrupting means including means to engage said gear for interrupting unloading movement of the timing element.

WILLIAM C. CRIMMINS.

REFERENCES CITED

The following references are of record in the file of this patent:

UNITED STATES PATENTS

| Number | Name | Date |
| --- | --- | --- |
| 1,317,893 | Roberts | Oct. 7, 1919 |
| 1,836,973 | Jacobson | Dec. 15, 1931 |
| 2,274,635 | Rhodes | Mar. 3, 1942 |